US009589015B1

(12) United States Patent
Bozkaya et al.

(10) Patent No.: US 9,589,015 B1
(45) Date of Patent: *Mar. 7, 2017

(54) ENHANCING QUERIES FOR DATA TABLES WITH NESTED FIELDS

(71) Applicant: Google Inc., Mountain View, CA (US)

(72) Inventors: Tolga Bozkaya, Belmont, CA (US); Chirayu Krishnappa, San Mateo, CA (US); Armand Dijamco, San Francisco, CA (US); Emmett Andrew Cunningham, San Bruno, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,050

(22) Filed: Aug. 24, 2015

Related U.S. Application Data

(63) Continuation of application No. 13/833,334, filed on Mar. 15, 2013, now Pat. No. 9,146,984.

(51) Int. Cl.
  *G06F 17/30* (2006.01)

(52) U.S. Cl.
  CPC .. *G06F 17/30427* (2013.01); *G06F 17/30339* (2013.01)

(58) Field of Classification Search
  CPC ........ G06F 17/30427; G06F 17/30448; G06F 17/3066; G06F 17/30339
  USPC ....................... 707/756, 759, 760
  See application file for complete search history.

(56) References Cited

U.S. PATENT DOCUMENTS

| 5,829,006 A | * | 10/1998 | Parvathaneny ... | G06F 17/30607 707/999.104 |
| 7,020,661 B1 | * | 3/2006 | Cruanes ............ | G06F 17/30498 707/999.103 |
| 7,310,638 B1 | * | 12/2007 | Blair ................. | G06F 17/30516 707/999.003 |
| 7,805,456 B2 | | 9/2010 | Meijer et al. | |
| 7,865,533 B2 | | 1/2011 | Meijer et al. | |
| 7,991,768 B2 | * | 8/2011 | Baby ................. | G06F 17/30911 707/716 |
| 9,405,802 B2 | * | 8/2016 | Vuksan ............. | G06F 17/30528 707/999.003 |
| 2001/0047372 A1 | * | 11/2001 | Gorelik ............. | G06F 17/30604 715/239 |
| 2006/0195427 A1 | * | 8/2006 | Kilroy ................ | G06F 17/3046 707/999.003 |
| 2007/0038618 A1 | * | 2/2007 | Kosciusko ........ | G06F 17/30448 707/999.004 |
| 2008/0189258 A1 | | 8/2008 | Meijer et al. | |
| 2008/0189277 A1 | | 8/2008 | Meijer et al. | |

(Continued)

OTHER PUBLICATIONS

Office Action for U.S. Appl. No. 13/833,334, dated Feb. 27, 2015, 23 pages.

(Continued)

*Primary Examiner* — Phong Nguyen
(74) *Attorney, Agent, or Firm* — Lowenstein Sandler LLP

(57) ABSTRACT

Systems and methods for enabling querying of nested or repeated structures with simple, non-nested group by queries derived from a template. In particular, non-flat tables (e.g., tables with repeated or nested structures) can be queried from a frontend interface as though the tables flat, exposing data associated with the nested structures by way of the non-nest queries.

20 Claims, 9 Drawing Sheets

(56) References Cited

U.S. PATENT DOCUMENTS

| | | | |
|---|---|---|---|
| 2008/0189303 A1 | 8/2008 | Bush et al. | |
| 2008/0319969 A1* | 12/2008 | Dettinger | G06F 17/30398 707/E17.005 |
| 2009/0125494 A1* | 5/2009 | Baby | G06F 17/30935 707/E17.017 |
| 2012/0310878 A1* | 12/2012 | Vuksan | G06F 17/30575 707/609 |
| 2014/0172833 A1* | 6/2014 | Taylor | G06F 17/30448 707/722 |

OTHER PUBLICATIONS

Notice of Allowance for U.S. Appl. No. 13/833,334, dated Jun. 24, 2015, 55 pages.

* cited by examiner

EXAMPLE VIEW OF DATA TABLE 114 WITH EXAMPLE NESTED FIELDS 116

| COUNTRY | VIDEO_ID | ADS | | |
|---|---|---|---|---|
| | | FORMAT | IMPRESSIONS | CLICKS |
| USA (302₁) | 1 | 'XXX' | 1 | 3 |
| | | 'YYY' | 2 | 1 |
| | | FORMAT | IMPRESSIONS | CLICKS |
| CANADA (302₂) | 1 | 'XXX' | 1 | 0 |
| | | 'YYY' | 1 | 1 |
| | | 'ZZZ' | 3 | 0 |

FIG. 3

ENHANCING QUERIES FOR DATA TABLES WITH NESTED FIELDS

CROSS-REFERENCE TO RELATED CASES

This application is a continuation of U.S. patent application Ser. No. 13/833,334, filed Mar. 15, 2013, and entitled, "ENHANCING QUERIES FOR DATA TABLES WITH NESTED FIELDS," the entirety of which is incorporated herein by reference.

TECHNICAL FIELD

This disclosure generally relates to improving capabilities in connection with simple query templates associated with queries of data tables with nested fields.

BACKGROUND

Conventional systems relating to data warehousing and other similar domains can process tens or even hundreds of terabytes of data per day and can generate tables with different schemas and sizes for users to run queries to extract information and perform other analysis on those data. In some cases individual data tables can reach or even exceed one terabyte in size for a given day. Hence, analysis over a one-year period can mean hundreds to even thousands of terabytes of data need to be processed by an associated query engine.

Using traditional relational database system for such large data warehouses is generally not feasible due to issues with scalability, performance, and cost. As a result, conventional frontend reporting platforms do not provide adequate flexibility or features with respect to querying data at the backend, particularly querying data residing in nested fields of the data table.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to enabling querying of nested or repeated structures from conventional reporting frontends by way of a non-nested query. An interface component can be configured to receive from a structured query language (SQL) reporting platform frontend an SQL query. The SQL query can be a non-nested group by query with a scoped operator. The interface component can transmit a translated query to an SQL backend that operates on the data table that includes a nested field. A translation component can be configured to translate the SQL query to the translated query.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present disclosure will be apparent upon consideration of the following detailed description, taken in conjunction with the accompanying drawings, in which like reference characters refer to like parts throughout, and in which:

FIG. 3 depicts a block diagram of an example view of the data table with example nested fields in accordance with certain embodiments of this disclosure;

DETAILED DESCRIPTION

Overview

Figure 1:
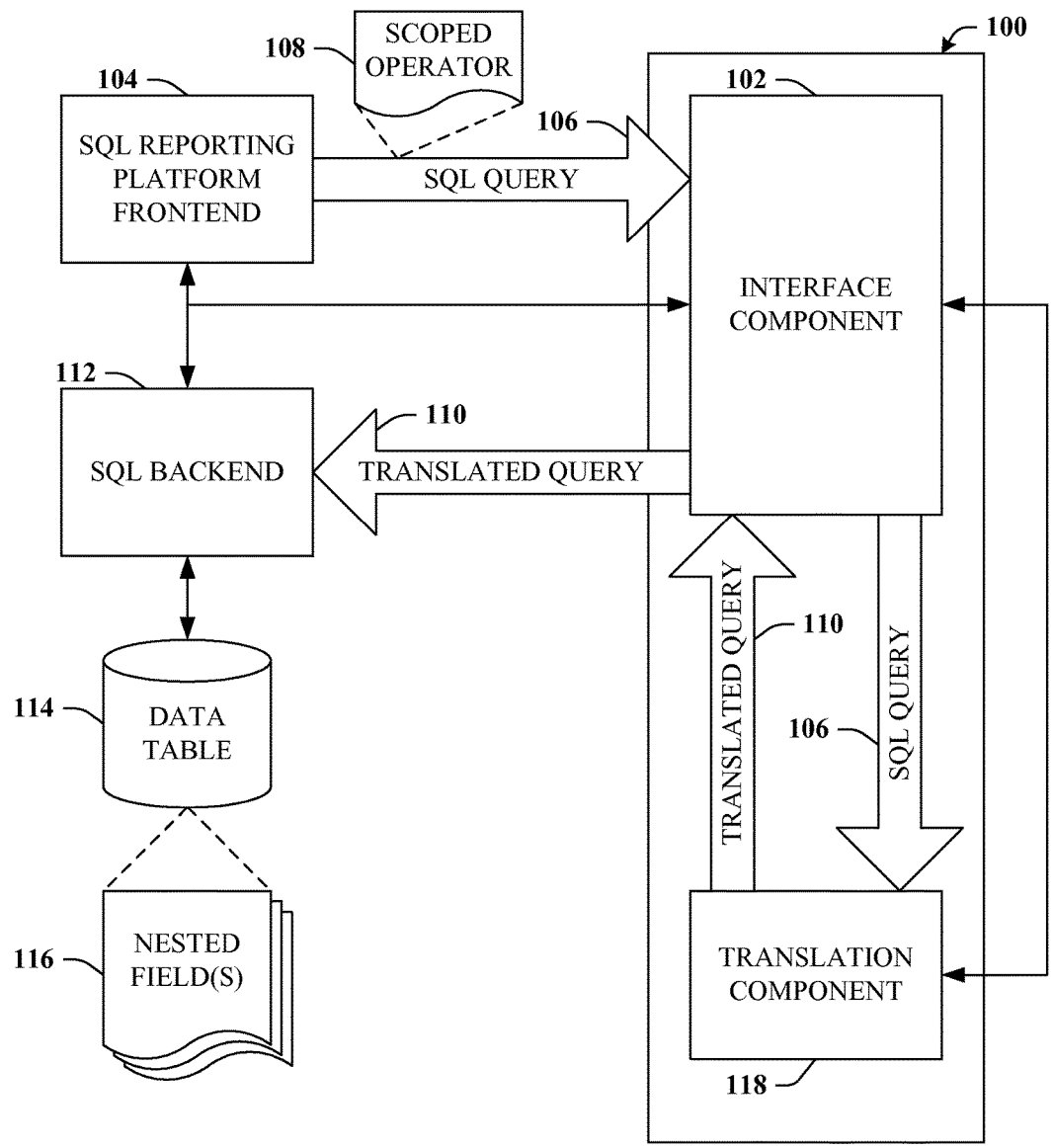
FIG. 1 illustrates a block diagram of an example system that can expose nested or repeated structures that exist in a non-flat view of a data table in a manner consistent with a flat view of the data by way of simple queries in accordance with certain embodiments of this disclosure.

As noted above, due to the large amount of data of certain data warehousing systems, relational database systems are not feasible. Instead, when dealing with such large amounts of data, conventional systems typically use a file-based storage system, map-reduce-based querying, and extraction-transaction-load (ETL) tools, which relate to generating queriable tables from data that are in raw or unprocessed format, typically stored in data log files. Commonly, the backend query infrastructure generates tables in a column-based storage format that allows for fast access and filtering on columns referenced in a query, while also providing excellent compression in connection with the large amount of data. The column-based storage format (which can be referred to herein as 'columnar format') further allows data to be stored in a nested format, where nested fields can have repeated values/fields.

Some conventional backend components include query constructs that sophisticated users can employ for querying tables with such nested fields by generating nested queries. On the other hand traditional frontend systems are designed to cater to relatively unsophisticated users who do not have the knowledge to generate complex queries. Such users typically rely on predefined reporting templates that list certain entities (e.g., columns or other fields, data tables, dimensions, metrics) in connection with querying the underlying table. Users can simply select these entities and the frontend automatically generates the query and delivers the query to the backend.

As a result, queries generated at the frontend are typically simple (e.g., non-nested) group by queries because simple, non-nested group by queries are especially convenient and often the only feasible type to convert to templates used at the frontend by unsophisticated users. Unfortunately, non-nested group by queries either assume the data table is flat (e.g., does not include nested entities) or implicitly or explicitly generate a new, flattened table from the nested table. Flattening the data table, particularly in the case of large data warehouse systems, is extremely expensive in terms of costs, resource utilization, and time awaiting results. In some cases, a particular data table might be so large that the process of flattening is beyond the capabilities of the system to accomplish quickly enough to satisfy a typical online query.

Systems and methods disclosed herein relate to exposing nested or repeated structures that exist in a non-flat (e.g., nested) data table in a manner consistent with a flat view of the data, particularly in the case of non-relational database data tables such as ETL data tables or other columnar data tables extracted from data logs. Frontend business reporting platforms, which typically assume a flat view of the data, can be utilized to query information included in nested structures without modification to the reporting platform and without generating a new table with a flat view. Associated queries generated by the frontend can be non-nested group by queries suitable for adapting to a frontend template, yet capable of exposing the nested structures by utilizing a scoped operator as described herein. In contrast, conventional systems typically require nested queries from the frontend in order to expose nested structures included in the data table. Complex, nested queries are beyond the knowledgebase and skillset of many frontend users and generally cannot be readily converted to templates used by frontend users to make such complex queries available to unsophisticated frontend users. Because these complex, nested queries cannot be readily converted to templates, in order to fashion such a query the user typically must possess adequate knowledge of the underlying data and particularly the schema of the data, which is not the case for many users.

One example of a scoped operator is the WithinRecordTransform construct, which is used in the remainder of this document. However, it is appreciated that other scoped operators can exist and will typically be related to the brand or type of the reporting platform frontend. Data associated with the scoped operator can be translated such that syntax that assumes a flat view can be transformed to valid syntax for the backend in which repeated structures exist in the actual table.

Examples of Exposing Nested Structures

Various aspects or features of this disclosure are described with reference to the drawings, wherein like reference numerals are used to refer to like elements throughout. In this specification, numerous specific details are set forth in order to provide a thorough understanding of this disclosure.

It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can choose not to provide personal information, location information, proprietary information, sensitive information, or the like in connection with data gathering aspects. Moreover, one or more implementations described herein can provide for anonymizing collected, received, or transmitted data.

Referring now to FIG. 1, a system 100 is depicted. System 100 can expose nested or repeated structures that exist in a non-flat view of a data table in a manner consistent with a flat view of the data by way of simple queries. Such can be particularly advantageous for cases in which data are stored in a non-relational database format, which is common for very large data aggregators. It is further advantageous to expose nested structures by way of simple (e.g., non-nested) queries because complex (e.g., nested) queries are often not suitable for conversion to frontend templates used by unsophisticated users. As used herein, the term "nested" is used in two distinct contexts. In relation to a data entity such as "nested structure," "nested field," or "nested table" such is intended to be similar to or synonymous with a repeated structure or field, which relates to a data field that includes multiple values of a primitive (e.g., integer, string . . . ) or non-primitive (e.g., an address) type. In relation to a query such as "nested query" such is intended to refer to queries that are generally more complex as opposed to queries that are simple (e.g., non-nested). For example, a "non-nested query" can relate to queries in which a FROM clause included in the query refers to a table, whereas a "nested query" can relate to queries in which the FROM clause includes a subquery.

Figure 8:
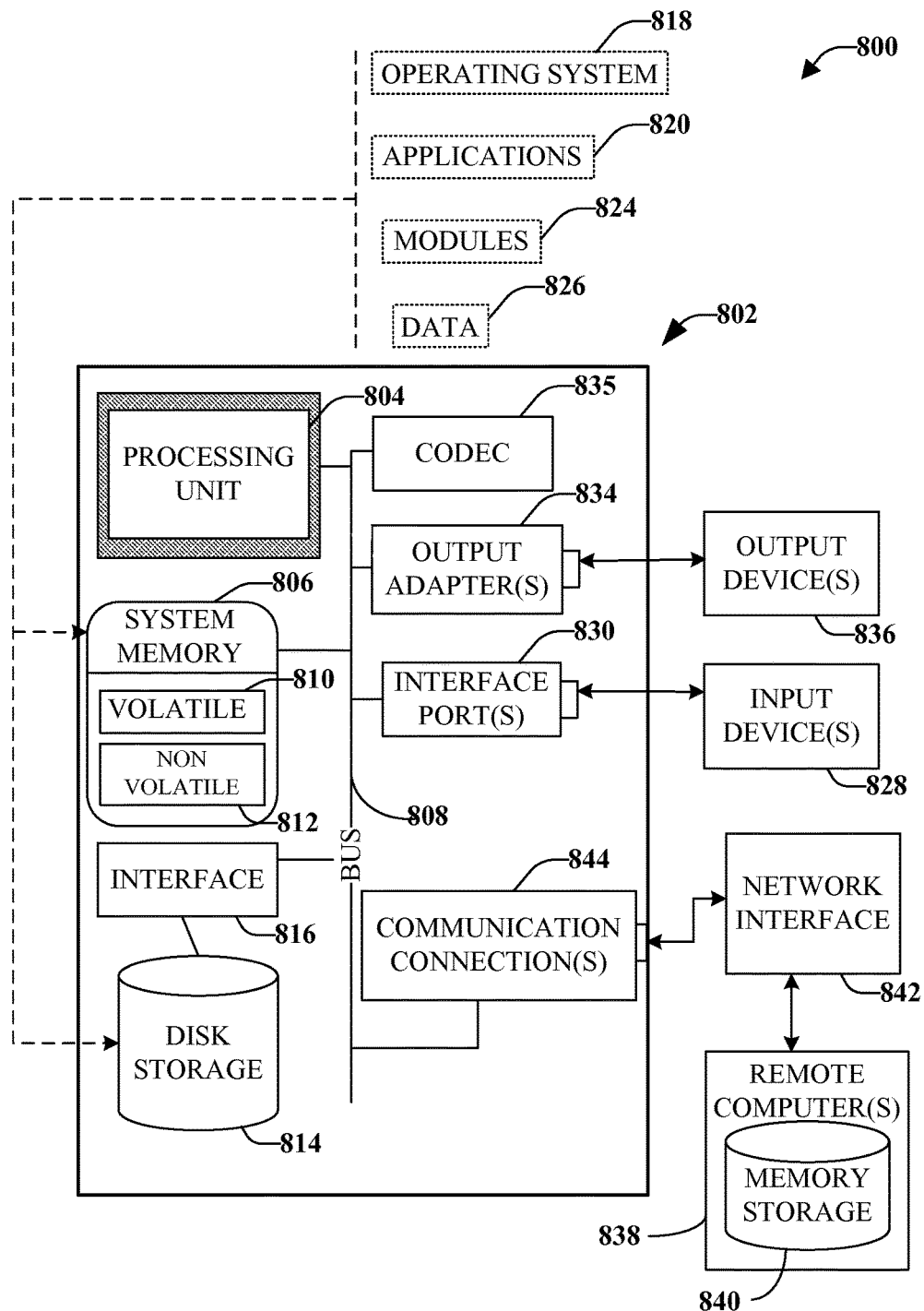
FIG. 8 illustrates an example schematic block diagram for a computing environment in accordance with certain embodiments of this disclosure.

System 100 can include a microprocessor that executes computer executable components stored in memory, structural examples of which can be found with reference to FIG. 8. It is to be appreciated that the computer 802 can be used in connection with implementing one or more of the systems or components shown and described in connection with FIG. 1 and other figures disclosed herein. As depicted, system 100 can include an interface component 102 and a translation component 118.

Interface component 102 can be configured to receive from a structured query language (SQL) reporting platform frontend 104 SQL query 106. SQL query 106 can be, e.g., a non-nested GROUP BY query and can include one or more scoped operator(s) 108. For example, a simple, non-nested GROUP BY query can be readily converted to a template at the frontend and can be defined as a GROUP BY query in which a FROM clause references a data table and/or does not include a subquery. The WithinRecordTransform( ) construct is one non-limiting example of scoped operator 108, as noted supra. SQL query 106 can be directed to an online query that is executed by way of volatile memory rather than being executed by slower, non-volatile memory, however such need not be the case. Interface component 102 can be configured to transmit translated query 110 to SQL backend 112. Translated query 110 can be an SQL expression that is similar to that for SQL query 106, with differences resulting from a translation of the original SQL query 106 detailed below.

SQL backend 112 can operate on data table 114, which can be a nested table and/or include a nested field. For example, data table 114 can include one or more records (e.g., rows) in which a field (e.g., column) of that record is a table itself (e.g., nested fields(s) 116. An example of a view of data table 114 is provided with reference to FIG. 3. In some embodiments, records associated with data table 114 are session records that relates to data stored in connection with a communication session between a server and a client, which is further detailed in connection with FIGS. 2 and 3.

System 100 can also include translation component 118 that can be configured to translate SQL query 106 into translated query 110. Further detail relating to examples of translating SQL query 106 into translated query 110 is provided in connection with FIGS. 4 and 5.

Figure 2:
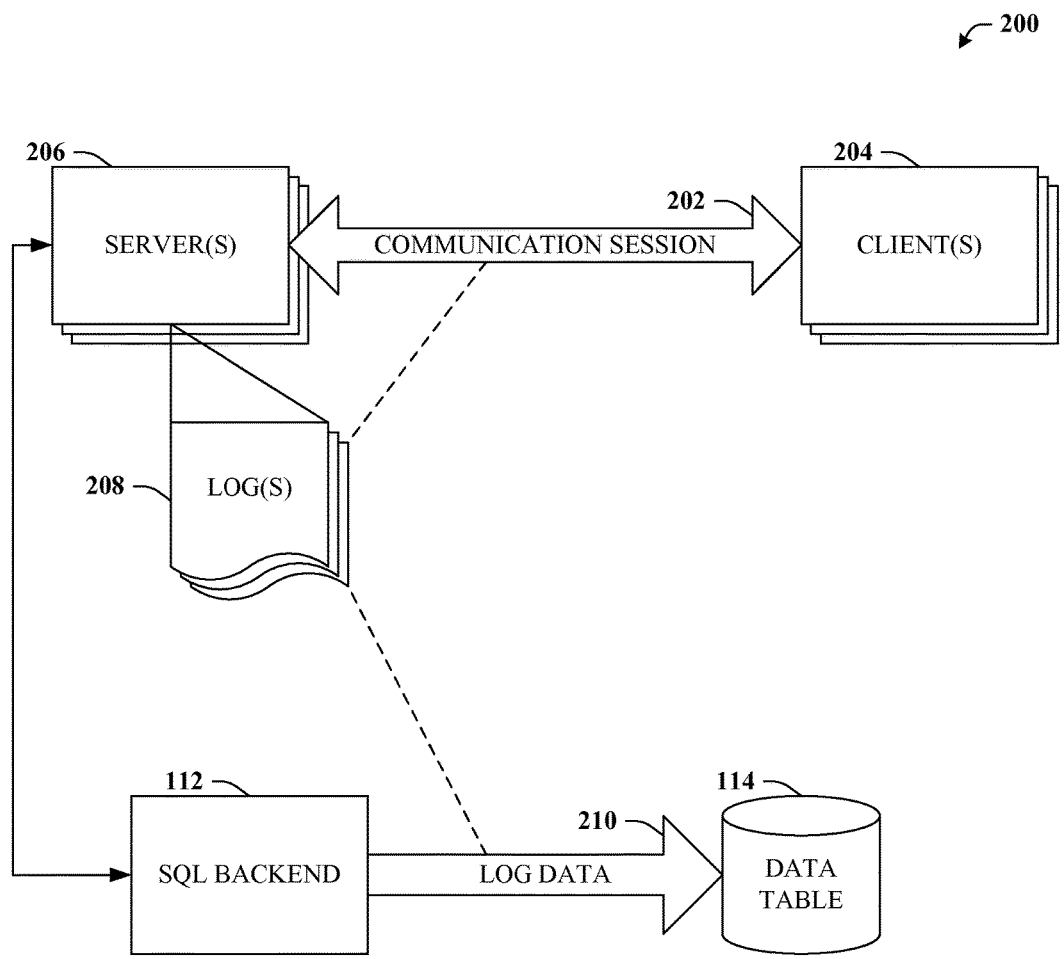
FIG. 2 illustrates a block diagram of an example system depicting an example communication session from which events can occur that appear in nested fields of the data table in accordance with certain embodiments of this disclosure.

FIGS. 2-5 are intended to be referenced in unison with FIG. 1 for additional clarity and/or to provide additional concrete examples of the disclosed subject matter. Turning now to FIG. 2, system 200 is illustrated. System 200 illustrates an example communication session 202 from which events can occur that appear in nested fields 116 of data table 114. In this case, one or more clients 204 connect to one or more servers 206, typically by way of a wide area network such as the Internet. Communication session 202 is created, which can occur, for example when a user utilizing client 204 (e.g., a browser) visits a web page or watches a video hosted by server 206.

In these and other cases, server 206 stores various information relating to the communication session 202 in log 208. For example, log 208 can record the behavior of the webpage (e.g., what ads or other elements were served), the behavior of client 204 (e.g., clicks or other inputs, time spent, etc.). Information stored in logs 208 is provided to SQL backend 112 where log data 210 associated with logs 208 is employed to create data table 114. In the case of very large data aggregators such logs can consume many terabytes of storage space for a single day. Therefore, data table 114 can exist in a columnar format that is advantageous for very large amounts of data and can be distinct from traditional relational database format.

With reference now to FIG. 3, illustration 300 is provided. Illustration 300 depicts an example view of data table 114 with example nested fields 116. In this case, the records 302 relate to data collected in response to viewing a video. Substantially any number of records can exist in data table 114, and each record (e.g., $302_1$, $302_2$) can have numerous columns/fields, although for the sake of brevity, only three fields are depicted. The first field relates to the country associated with the viewer and the second field relates to a count or ID of the video being viewed. The third field, which is a nested fields relates to various information associated with ads presented in connection with the video being viewed. The nested table included in the ads column (e.g., nested field 116) also includes three fields though it is appreciated that any number of fields can exist. These nested fields illustrated relate to a format associated with the ad, a number of impressions associated with the ad, and a number of clicks associated with the ad.

Turning back to FIG. 1 and still referring to FIGS. 2 and 3, a concrete example is provided. Consider the case of a user at frontend 114 interested in querying information included in data table 114 residing at backend 112. Traditional frontend interfaces allow for specification of reporting templates from which users can generate reports. A reporting template can be created by specifying a query template that can be used to generate sets of 'dimensions' and 'metrics.' For example:

TABLE: T: <table_name>
DIMENSIONS: {d1: <dim_exp1>,
    d2: <dim_exp2>}
MEASURES: {m1: <measure_exp1>,
    m2: <measure_exp2>}
QUERY TEMPLATE:
SELECT <dimensions>,
    <measures>
FROM T
WHERE
    <dimension-filters>
GROUP BY<dimensions>
HAVING
    <measure-filters>;

The dimensions can be expressions or attributes that are of interest to the user (e.g., country, video_ID, uploader_channel, partner_name, etc.) and measures can relate to aggregate expressions over properties for which calculations can be performed (e.g., SUM(playback), COUNT(DISTINCT videos), SUM(revenue), etc.). A user can use the above template to retrieve data by simply selecting the dimensions and measures that are of interest, possibly also specifying filters on those dimensions or metrics.

For example, suppose the user is only interested in the d1 dimension for the specific range of [0, 1000] and the m1 measure. From the frontend interface (e.g., frontend 104), the user can click or otherwise select d1, specify any desired filters on d1 and then select m1. The query template can then be used to generate the associated query that will be delivered to the backend (e.g., backend 112) in order to retrieve the desired data. As such, the output from the frontend, in SQL form can appear as follows:

SELECT d1, m1
FROM T
WHERE d1 >=0 AND d1<=1000
GROUP BY d1
;

Consider the above in connection with example data table 114 of FIG. 3, where:
T: "video_playbacks"
d1: "video_id"
m1:"SUM(views) AS total_views"

In this case, the query can be thought of as a request for the total view count for the first 1000 uploaded videos, which can be output by the frontend as the following:

SELECT video_id, SUM(views) AS total_views
FROM video_playbacks
where video_id >=0 and video_id<=1000
GROUP BY video_id;

Now consider a query that specifies data included in nested fields 116 in connection with example data table 114 of FIG. 3. For example, Query1 below to compute the total number of impressions per video per country:

Query1:
SELECT video_id, country,
    SUM(ads.impressions) WITHIN RECORD as ad_impressions
FROM some_table;

As indicated previously, some conventional backend query engines include query constructs that enable users to query nested fields. An example of such is the scoped operator construct, WITHIN RECORD, which indicates to the query engine that aggregation is to be done within the ads field of each record 302. The result of Query1 can appear as follows in Table I.

TABLE I

| country | video_id | ad_impressions |
|---|---|---|
| USA | 1 | 3 |
| CANADA | 1 | 5 |

It is appreciated that WITHIN RECORD aggregation is different than GROUP BY aggregation as the former does not collapse rows at the top level/scope, but rather collapses rows at a lower level/scope included in some nesting. While Query1 represents a relatively simple query that can be accomplished with existing tools, consider a more complicated query. For instance, a query that requests the total number of impressions per video for views with at least one impression with ad_format 'ZZZ'. Such a query is not trivial to produce as a simple group-by-aggregation query. However, the query can be readily written as a nested query, as illustrated by Query2:

Query2:
SELECT video_id, SUM(ad_impressions)
FROM (SELECT video_id,
   SUM(ads.impressions) WITHIN RECORD as ad_impressions,
   SUM(IF(ads.ad_format='zzz', ads.impressions, 0))
    WITHIN RECORD as unq_alias_1
   FROM some_table)
WHERE zzz_impressions >0
GROUP BY video_id;
Results to Query2 can be as follows in Table II:

TABLE II

| video_id | ad_impressions |
|---|---|
| 1 | 5 |

Query2 represents a conventional means of exposing data included in nested or repeated structures, however, because Query2 is a nested query (e.g., the FROM clause is a subquery, not an existing table) rather than a simple, non-nested GROUP BY query, this query typically cannot leverage the use of templates. Therefore users of the frontend, in order to construct Query2, generally must do so manually, which requires those users to have adequate knowledge of both SQL and the underlying structure of the data.

Such creates a number of issues associated with conventional approaches. For example, users of the frontend should be able to get results by choosing particular cuts (e.g., dimensions) of data in a simple manner. Given that it is expected that users will have different levels of understanding of the data tables underneath or even adequate query language knowledge, templates should also be available, since such can enable unsophisticated users to successfully utilize the frontend. Expecting users to create queries manually in an ad hoc manner is neither realistic nor productive.

As a second example, a simple view of data is typically better than more complex views. In most cases, a simple view of the data translates to presenting a flat or non-nested view of the data, as if there are essentially just dimensions and metrics and a simple (non-nested) group by aggregation query is all that is needed to retrieve the data desired. Third, it is typically neither feasible nor productive to present users with multiple ways of querying the same table and rely on the user to choose which way is best for their particular need. Rather, simplicity can be a key factor in user adoption, which generally translates into a single, simple way of querying the data table.

The above-mentioned issues tend to illustrate that data is only as useful as it is easy to retrieve from the user's perspective. In order to make data easy to retrieve, templates should be available to users in most cases and data should be provided according to a flat view, even in scenarios where the data are not flat such as is the case for tables with nested or repeated fields. Expressly flattening a table by way of preprocessing the table beforehand increases costs and also introduces serious complexities caused by duplication of non-nested fields due to the process of flattening (e.g., duplicates of non-nested fields can result in erroneous values for summing or counting operations on those non-nested fields). Furthermore, in the case of multiple independently repeated fields, flattening is not feasible at all. These issues also exist in scenarios in which the table is flattened at query time, without preprocessing.

Still another issue associated with conventional approaches relates to receipt of results in a timely manner. Queries generated using query templates are sent to the backend for data retrieval, and the received data is simply formatted in the manner desired by the fronted, then presented to the user. The user therefore must wait for these queries to be executed before being presented the data. While backend engines might perform certain optimization, the timeliness of delivering results can be improved by transmitting to the backend a query that is already optimized. Generally, it is possible to generate many different types of queries based on the particular data the user desires. However, frontend platforms typically do not have the sophistication or the domain knowledge. Furthermore, it is not desirable to generate report templates on the same data table using different query templates, as it is not feasible to scale this process and users typically do not want to determine which report template to use for their purposes.

To address the issues discussed above, a query transformation engine can operate as a proxy between the reporting frontend 104 and the backend query engine 112. The query transformation engine can be exemplified by system 100 of FIG. 1, which can provide for the introduction of new query constructs such as scoped operator 108. These new query constructs can be interpreted by the query transformation engine and the simple, template-based query that includes these constructs can, when necessary, be transformed into a complex nested query that backend 112 understands. Hence, simple group-by-aggregation query templates for the frontend can be specified while queries reaching the backed can be as complicated or expressive as necessary to retrieve the desired data.

These new query constructs relate to scoped operator 108, which is exemplified herein as WITHINRECORDTRANSFORM. Scoped operator 108 can be used in a dimension or metric expression of a query template, which enables the query template to remain in the shape of a simple group by query. The simple queries (e.g., SQL queries 106) generated at frontend 104 using these templates can be processed by system 100 to translate those simple queries into complex, nested query blocks when such is necessary. Instead of creating complex queries at frontend 104 and relying on backend 112 to perform all optimizations, system 100 can generate and send backend 112 translated query 110 that is already optimized.

For example, consider Query3 (with an associated query template specified) below, which has the same constraints as Query2 above: to compute the total number of impressions per video for views with at least one impression with ad_format 'ZZZ'.

Figure 4:
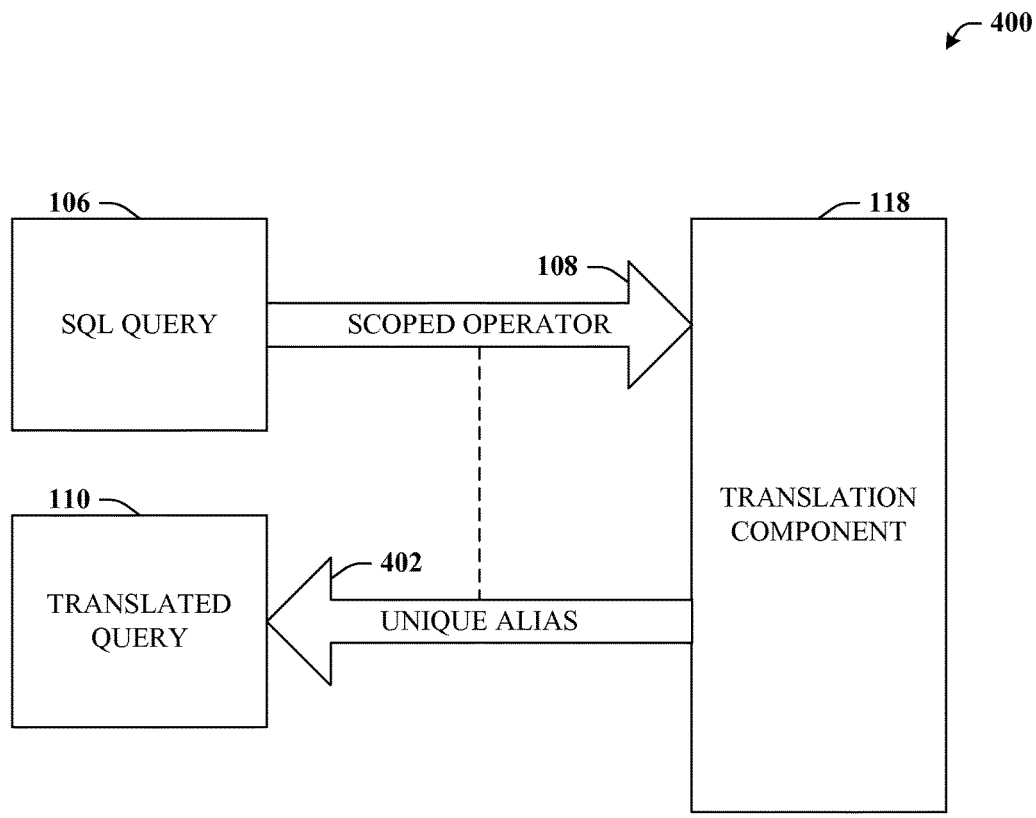
FIG. 4 illustrates a block diagram of an example system that can provide for additional features or detail relating to a unique alias in connection with the translation component in accordance with certain embodiments of this disclosure.
Figure 5:
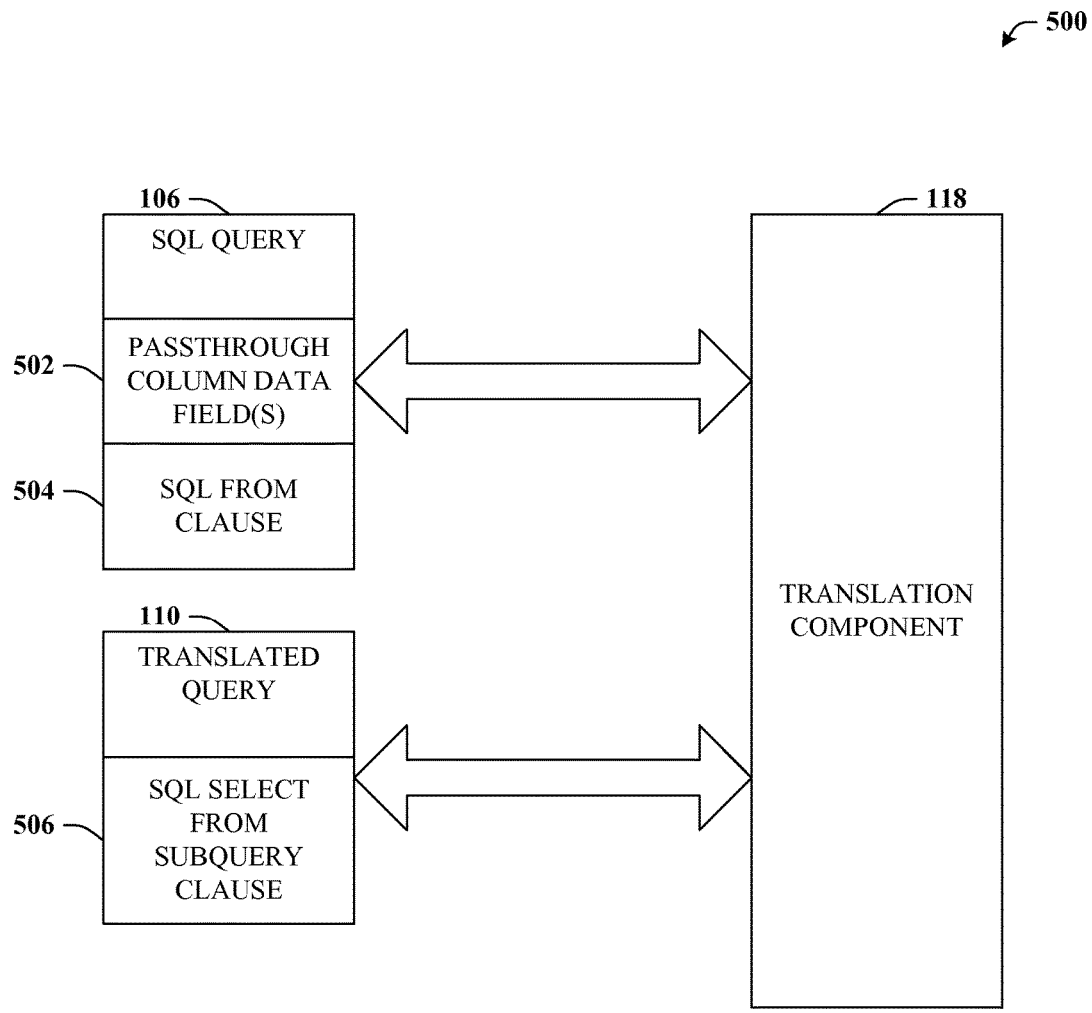
FIG. 5 illustrates a block diagram of an example system that can provide for additional features or detail relating to a passthrough columns and subqueries in connection with the translation component in accordance with certain embodiments of this disclosure.

Query3:

TABLE: T: some_table
DIMENSIONS: {video_id: video_id,
　country: country,
　. . .
　ZZZ_impressions_per_view:
WITHINRECORDTRANSFORM(SUM(IF
　(ads.ad_format='ZZZ',
　ads.impressions, 0)))}
MEASURES: {view_count: COUNT(*),
　. . .
　ad_impressions:
SUM(WITHINRECORDTRANSFORM(SUM(ads.impressions)))}
SELECT video_id,
　SUM(WITHINRECORDTRANSFORM(SUM(ads.impressions))) as ad_impressions
FROM some_table
WHERE
　WITHINRECORDTRANSFORM(SUM(IF
　　(ads.ad_format='ZZZ', ads.impres sions, 0))) >1
GROUP BY video_id Given the template, Query3 can be generated by selecting video_id dimension, selecting ad_impressions metric, and specifying a filter on ZZZ_impressions_per_view dimension. Unlike Query2, which is a complex, nested query, Query3 is a simple, non-nested query that can be readily constructed with an associated template. While Query3 is not in a form that can be interpreted by backend 112, system 100 can translate Query3 into a complex query that is similar to Query 2. For example, assuming Query3 represents SQL query 106 generated at frontend 104, translated query 110 can be generated as follows in Query4 and provided to backend 112:

Query4:
SELECT video_id, SUM(unq_alias_0) as ad_impressions
FROM (SELECT video_id,
　SUM(ads.impressions)　WITHIN　RECORD　as
　　unq_alias_0,
　SUM(IF(ads.ad_format='zzz', ads.impressions, 0))
　　WITHIN RECORD as unq_alias_1
　FROM some_table)
WHERE unq_alias_1>0
GROUP BY video_id;

Additional features or detail in connection with translating SQL query 106 into translated query 110 is provided with reference to FIGS. 4 and 5, which can be readily identified with reference to Query3 as an example of SQL query 106 and Query4 as an example of translated query 110.

Turning now to FIG. 4, system 400 is provided. System 400 illustrates additional features or detail relating to a unique alias in connection with translation component 118. For example, upon receipt of SQL query 106, translation component 118 can assign a unique alias 402 to scoped operator 108. In cases where multiple different scoped operators 108 are included in SQL query 106, a respective unique alias 402 can be assigned to each of the different scoped operators. In cases where the same scoped operator appears multiple times in SQL query 106, the associated unique alias 402 can be assigned to each of the multiple references to the scoped operator 108.

In some embodiments, translation component 118 can replace the scoped operator 108 with the associated unique alias 402. The unique alias 402 can therefore be included in translated Query 110, which is further detailed infra in connection with FIG. 5. For example, it is noted that the first two occurrences of WITHINRECORDTRANSFORM (e.g., scoped operator 108) appearing in Query3 were replaced with a first unique alias 402 (e.g., unq_alias_0), while the second two references were replaced with a second unique alias 402 (e.g., unq_alias_1). Automatic generation of unique alias 402 by transformation component 118 can allow users of system 100 to avoid generating names for each and every use case manually. In addition, use of unique alias 402 can efficiently avoid recomputing the same scoped operator 108 expression (e.g., the same WITHINRECORDTRANSFORM expression) in the event that particular scoped operator 108 is referenced multiple times in SQL query 106.

Referring now to FIG. 5, system 500 is provided. System 500 illustrates additional features or detail relating to passthrough columns and subqueries in connection with translation component 118. In some embodiments translation component can be configured to identify a passthrough column data field 502 referenced by SQL query 106, wherein the passthrough column data field 502 is not included in a scope associated with scoped operator 108. For example, various events included in repeated structures of record 116 are at the same scope as scoped operators 108. Each of these events differs and if the view of data table 114 is flattened, each record for a particular session ID can include a different event. On the other hand, many data fields or columns can exist in records 302 at the record level, which do not change for a flattened view of data table 114. For instance, the country column and the video_id column do not change when flattened, but rather would be duplicated. Such elements can be identified as passthrough column data field(s) 502.

As described, translation component can translate SQL query 106 into translated query 110. In some embodiments, translation component 118 can be configured to translate an SQL FROM clause 504 included in SQL query 106 into a SELECT FROM <subquery> clause 506 included in translated query 110. For example, translation component 118 can be configured to construct the subquery clause to select from passthrough column data field(s) 502 only. Additionally or alternatively, translation component 118 can be configured to construct the subquery clause to perform scoped operations (e.g., filtering, aggregation, etc.) utilizing an expression that is included in scoped operator 108. Such a subquery clause can include unique alias 402 as detailed previously.

Figure 6:
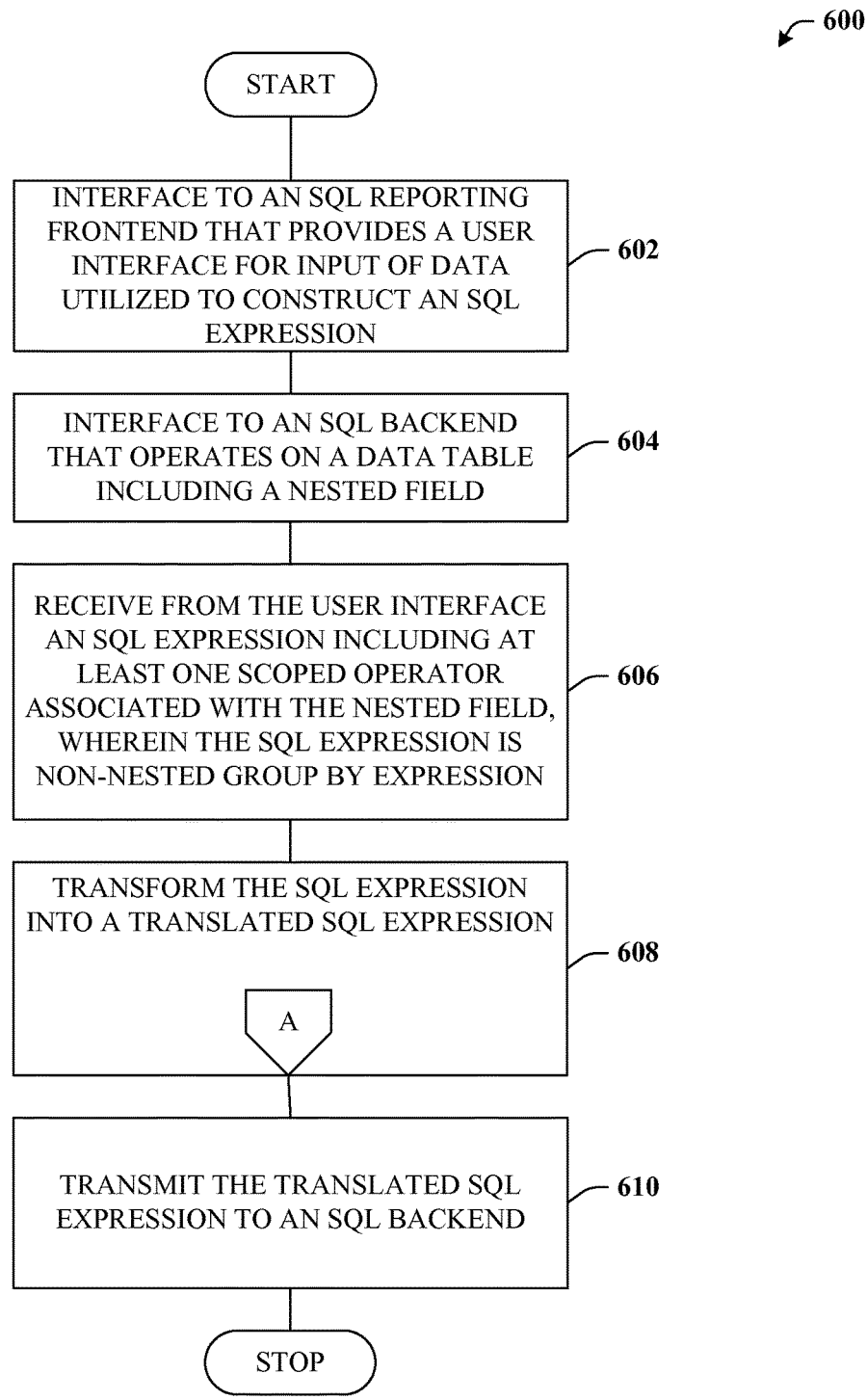
FIG. 6 illustrates an example methodology that can provide for converting a simple query to a complex query to access data included in a nested structure in accordance with certain embodiments of this disclosure.
Figure 7:
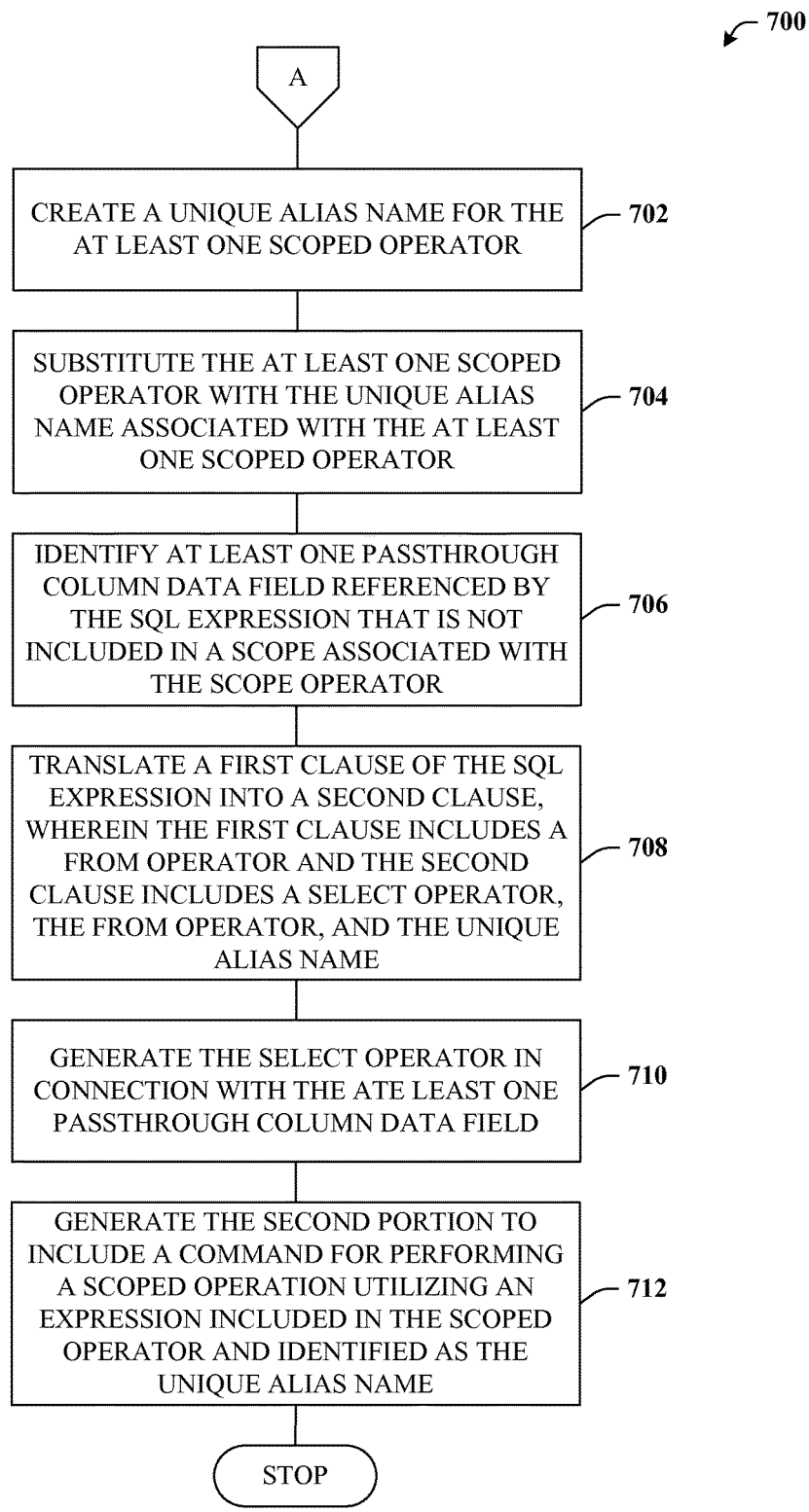
FIG. 7 illustrates an example methodology that can provide for additional features in connection with enabling query operations to be performed on nested or repeated structures without flattening or modifying the associated data table in accordance with certain embodiments of this disclosure.

FIGS. 6 and 7 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 6 illustrates exemplary method 600. Method 600 can provide for converting a simple query to a complex query to access data included in a nested structure. At reference numeral 602, an SQL reporting frontend that provides a user interface for input of data utilized to construct an SQL query can be interfaced (e.g., by an interface component).

At reference numeral 604, an SQL backend that operates on a data table including a nested field can be interfaced (e.g., by the same or different interface component). The data table can be in a columnar format that differs from relational database format and the data in the table can be derived from logs associated with event data generated in response to a communication session between a web server and a web client (e.g., a browser).

At reference numeral 606, an SQL expression can be received (e.g., by an associated interface component) from the user interface of the reporting frontend. The SQL expression can be a non-nested group by expression. The SQL expression can include at least one scoped operator associated with the nested field included in the data table.

At reference numeral 608, the SQL expression can be transformed into (e.g., by a translation component) into a translated SQL expression. Various aspects associated with transformation of the SQL expression into the translated SQL expression are further detailed with reference to FIG. 7 in connection with insert A. At reference numeral 610, the translated SQL expression can be transmitted to the SQL backend (e.g., by an associated interface component).

Turning now to FIG. 7, exemplary method 700 is depicted. Method 700 can provide for additional features in connection with enabling query operations to be performed on nested or repeated structures without flattening or modifying the associated data table. Method 700 can begin at the start of insert A which is in the context of transforming a first portion of the SQL expression into a second portion as detailed in connection with reference numeral 608. At reference numeral 702, a unique alias name can be created for the at least one scoped operator. If multiple scoped operators exist in the SQL expression, then a respective unique alias name can be created for all or a portion of those multiple scoped operators.

At reference numeral 704, the at least one scoped operator can be substituted with the unique alias name associated with that particular scoped operator. At reference numeral 706, at least one passthrough column data field can be identified. Typically, a passthrough column data field is a column (or other data field) that is referenced by the SQL expression but that is not included in a scope associated with the scope operator. In other words, passthrough columns represent data fields that are at the record level or at least one level above the data fields included in the repeated structures associated with the scoped operator.

At reference numeral 708, a first clause of the SQL expression can be translated into a second clause. The first clause can include a FROM operator and the second clause can include a SELECT operator, a FROM operator, and the unique alias name. At reference numeral 710, a clause associated with the SELECT operator of the translated SQL expression can be generated in connection with the at least one passthrough column data field.

At reference numeral 712, the second portion can be generated to include a command for performing a scoped operation utilizing an expression included in the scoped operator and identified as the unique alias name.
Example Operating Environments The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 8, a suitable environment 800 for implementing various aspects of the claimed subject matter includes a computer 802. The computer 802 includes a processing unit 804, a system memory 806, a codec 835, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. In addition, according to present innovations, codec 835 may include at least one of an encoder or decoder, wherein the at least one of an encoder or decoder may consist of hardware, software, or a combination of hardware and software. Although, codec 835 is depicted as a separate component, codec 835 may be contained within non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 802 may also include removable/non-removable, volatile/non-volatile computer storage medium. FIG. 8 illustrates, for example, disk storage 814. Disk storage 814 includes, but is not limited to, devices like a magnetic disk drive, solid state disk (SSD) floppy disk drive, tape drive, LS-100 drive, flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816. It is appreciated that storage devices 814 can store information related to a user. Such information might be stored at or provided to a server or to an application running on a user device. In one embodiment, the user can be notified (e.g., by way of output device(s) 836) of the types of information that are stored to disk storage 814 and/or transmitted to the server or application. The user can be provided the opportunity to choose whether or not such information is collected and/or shared with the server or application (e.g., by way of input from input device(s) 828).

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port may be used to provide input to computer 802 and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
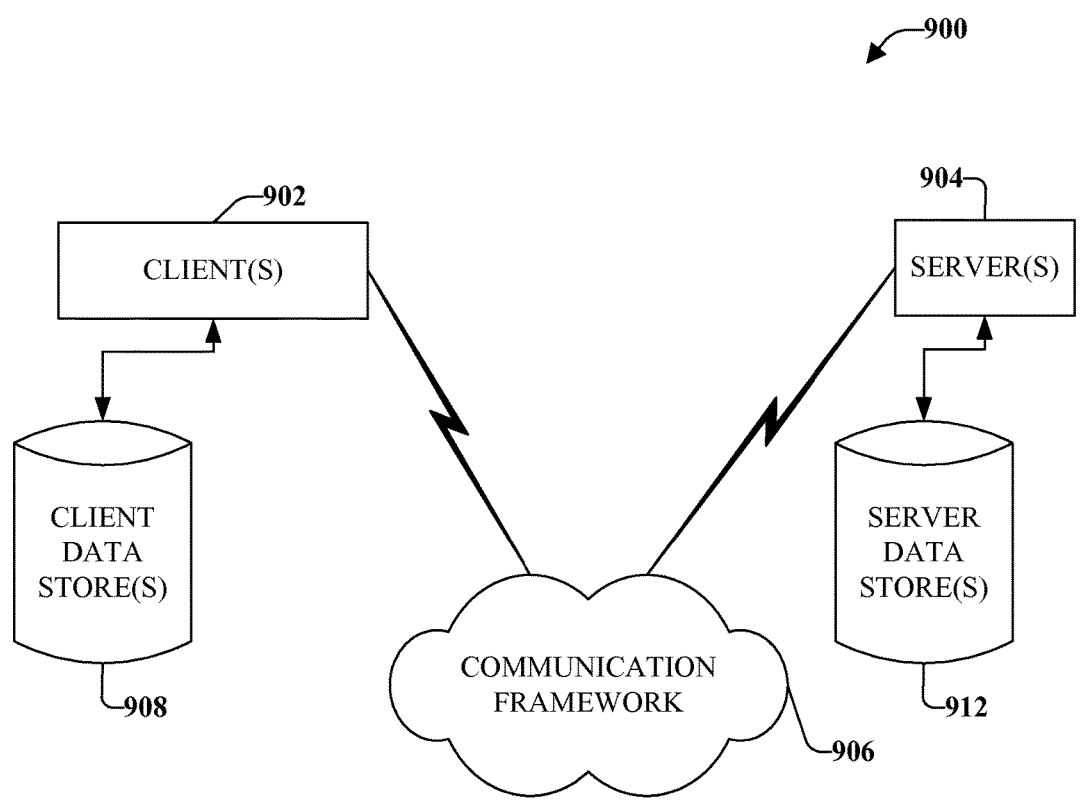
FIG. 9 illustrates an example block diagram of a computer operable to execute certain embodiments of this disclosure.

Referring now to FIG. 9, there is illustrated a schematic block diagram of a computing environment 900 in accordance with this specification. The system 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The system 900 also includes one or more server(s) 904. The server(s) 904 can also be hardware or hardware in combination with software (e.g., threads, processes, computing devices). The servers 904 can house threads to perform transformations by employing aspects of this disclosure, for example. One possible communication between a client 902 and a server 904 can be in the form of a data packet transmitted between two or more computer processes wherein the data packet may include video data. The data packet can include a cookie and/or associated contextual information, for example. The system 900 includes a communication framework 906 (e.g., a global communication network such as the Internet, or mobile network(s)) that can be employed to facilitate communications between the client (s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one embodiment, a client 902 can transfer an encoded file, in accordance with the disclosed subject matter, to server 904. Server 904 can store the file, decode the file, or transmit the file to another client 902. It is to be appreciated, that a client 902 can also transfer uncompressed file to a server 904 and server 904 can compress the file in accordance with the disclosed subject matter. Likewise, server 904 can encode video information and transmit the information via communication framework 906 to one or more clients 902.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present disclosure. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
   a processor; and
   a memory communicatively coupled to the processor, the memory having stored therein computer-executable instructions, comprising:
      an interface component to:
         receive from a structured query language (SQL) reporting platform frontend an SQL query, wherein the SQL query is a non-nested group by query, comprising a scoped operator to access a nested field; and
         transmit a translated SQL query to an SQL backend that operates on a data table in a non-relational database, wherein the data table comprises the nested field; and
      a translation component to translate the SQL query to the translated SQL query, wherein the translated SQL query comprises a nested query.

2. The system of claim 1, wherein the SQL query comprises a from clause that references the data table.

3. The system of claim 2, wherein the translation component is further to assign a unique alias to the scoped operator in the SQL query and replace the scoped operator with the unique alias included in the translated SQL query.

4. The system of claim 3, wherein the translation component is further to identify a passthrough column data field referenced by the SQL query, wherein the passthrough column data field is not included in a scope associated with the scoped operator.

5. The system of claim 4, wherein the translation component is further to translate the from clause in the SQL query to a select from subquery clause in the translated SQL query.

6. The system of claim 5, wherein the translation component is further to construct the subquery clause to select from the passthrough column data field.

7. The system of claim 5, wherein the translation component is further to construct the subquery clause to perform scoped operations utilizing an expression in the scoped operator and labeled as the unique alias.

8. A method, comprising:
   interfacing, by a system comprising a processor, to a structured query language (SQL) reporting frontend that provides a user interface for input of data utilized to construct an SQL expression;
   interfacing, by the system, to an SQL backend that operates on a data table in a non-relational database, wherein the data table comprises a nested field;
   receiving, by the system, from the user interface the SQL expression comprising at least one scoped operator to access the nested field, wherein the SQL expression is a non-nested group by expression;
   transforming, by the system, the SQL expression into a translated SQL expression, wherein the translated SQL expression comprises a nested query; and
   transmitting, by the system, the translated SQL expression to an SQL backend.

9. The method of claim 8, wherein the SQL expression further comprising a from clause referencing the data table.

10. The method of claim 9, wherein the transforming the SQL expression comprises creating a unique alias name for the at least one scoped operator.

11. The method of claim 10, wherein the transforming the SQL expression comprises substituting the at least one scoped operator with the unique alias name associated with the at least one scoped operator.

12. The method of claim 11, wherein the transforming the SQL expression comprises identifying at least one passthrough column data field referenced by the SQL expression that is not included in a scope associated with the at least one scoped operator.

13. The method of claim 12, wherein the transforming the SQL expression comprises translating a first portion of the SQL expression into a second portion, wherein the first portion comprises the from clause and the second portion comprises a select clause, the from clause, and the unique alias name associated with the at least one scoped operator.

14. The method of claim 13, wherein the translating the first portion comprises generating the select clause in connection with the at least one passthrough column data field.

15. The method of claim 14, wherein the translating the first portion comprises generating the second portion to comprise a command for performing a scoped operation utilizing an expression in the at least one scoped operator and identified as the unique alias name.

16. A non-transitory computer-readable medium having instructions stored thereon that, in response to execution, cause a system comprising a processor to perform operations comprising:
   receiving from a structured query language (SQL) frontend an SQL query that is a non-nested group by query comprising a scoped operator to access a nested field;
   transforming the SQL query to a translated SQL query that excludes the scoped operator, wherein the translated SQL query comprises a nested query; and
   transmitting the translated SQL query to an SQL backend that applies the translated SQL query to a data table with a nested field, wherein the data table is part of a non-relational database.

17. The system of claim 16, wherein the SQL query comprises a from clause that references the data table.

18. The system of claim 17, the operations further comprising utilizing a unique alias for the scoped operator to avoid repeat computations associated with the scoped operator.

19. The system of claim 18, the operations further comprising identifying a passthrough column data field referenced by the SQL query and not included in a scope associated with the scoped operator.

20. The system of claim 16, wherein the transforming the SQL query further comprises translating a first portion of the SQL query into a second portion, wherein the first portion includes the from clause and the second portion comprises a select clause, wherein the from clause and the select clause are associated with the scoped operator.

* * * * *